United States Patent [19]
Vermeersch

[11] Patent Number: 5,911,587
[45] Date of Patent: Jun. 15, 1999

[54] CARD READER HAVING A CONFIGURABLE SWITCH

[75] Inventor: Dean Camiel William Vermeersch, Harrisburg, Pa.

[73] Assignee: The Whitaker Corporation, Wilmington, Del.

[21] Appl. No.: 09/027,083

[22] Filed: Feb. 20, 1998

Related U.S. Application Data

[60] Provisional application No. 60/039,439, Feb. 26, 1997.

[51] Int. Cl.[6] .................................................. H01R 29/00
[52] U.S. Cl. ........................................... 439/188; 235/441
[58] Field of Search ............................ 439/188; 235/441, 235/492

[56] References Cited

U.S. PATENT DOCUMENTS

| | | | |
|---|---|---|---|
| 4,602,351 | 7/1986 | Shimamura et al. | 235/441 |
| 4,743,746 | 5/1988 | Murschall et al. | 235/441 |
| 4,900,273 | 2/1990 | Pernet | 439/630 |
| 5,013,255 | 5/1991 | Juret et al. | 439/188 |
| 5,334,034 | 8/1994 | Reichardt et al. | 439/188 |
| 5,334,827 | 8/1994 | Bleier et al. | 235/492 |
| 5,369,259 | 11/1994 | Bleier et al. | 235/441 |
| 5,370,544 | 12/1994 | Reichardt et al. | 439/188 |
| 5,775,929 | 7/1998 | Hashiguchi | 439/630 |

*Primary Examiner*—Steven L. Stephan
*Assistant Examiner*—Hae Moon Hyeon
*Attorney, Agent, or Firm*—Salvatore Anastasi

[57] ABSTRACT

A card reader 10, is provided for temporary electrical connection of a card 70 to a printed circuit board. The card reader 10, features a cover 14, which is hingeably mounted to a base 12 at a first end 28. The cover 14, is biased such that its bottom surface 26 is spaced apart from the base 12 at a second end 29. Card support projections 18 are formed from the cover 14, and act in combination with an actuator 20 which extends from the base 12 to draw the cover 14, towards the base 12 upon insertion of a card 70. As the cover 14 is drawn towards the base 12, a switch actuating projection 18,19 actuates a switch. The switch is configurable to be either normally open or normally closed and is changeable between such configurations by simply replacing an interchangeable switch contact 33.

11 Claims, 4 Drawing Sheets

CARD READER HAVING A CONFIGURABLE SWITCH

This application claims the benefit of U.S. Provisional application Ser. No. 60/039,439, Filed Feb. 26, 1997.

FIELD OF THE INVENTION

This invention is related to electrical connectors and more particularly to a configurable switch for use in a card reader.

BACKGROUND OF THE INVENTION

Smart cards are well known in the industry as being credit cards having computer chips embedded therein which are connected to metallic contact pads on a major surface of the credit card. These smart cards are insertable into card readers which make electrical contact with the pads of the card through contacts mounted in the card reader housing. Some card readers are provided with end of position switches to detect that a card has been inserted and is located in a read position. The switch serves to detect the card location and actuate a read circuit in the system. Card reading will therefore not be initiated until the card is detected as being in the read position.

One example of such a card reader including an end of position switch is disclosed in U.S. Pat. No. 5,334,827 by Bleier et al. Bleier et al. show a sliding type reader in which a smart card is inserted into the reader and is slid over the contacts until they are aligned with the pads of the smart card. The contacts are spring loaded against the card while the card is slid into the read position. A normally closed end of position switch is provided to detect that the card is in the read position.

A problem exists with these sliding-type card readers as disclosed by Bleier et al. in that excess wear occurs on the reader contacts due to a long wiping path at a high normal force during the mating and unmating cycle. As a result, debris is picked up by the reader contacts as they slide along the card surface. This debris is then deposited onto the card mating pads making it difficult to achieve a reliable electrical connection. Additionally, the debris can be deposited between the switch contacts to interrupt switch closure and therefore falsely indicate that a card is inserted in the read position.

A further problem exists with these types of card readers in that they typically utilize molded housings to provide guidance and alignment of the card within the card reader. When cards repeatedly come in contact with such plastic housing guiding or alignment members, dust/debris is generated as the two surfaces wear against each other. After many mating cycles, this dust/debris settles on the reader or switch contacts and the card mating pads to have a degrading effect on the electrical performance of the reader.

It is desirable in some systems to have a normally open end of position switch as opposed to the normally closed switch discussed above. Changing configuration of the switch typically would require redesigning the entire card reader so that insertion of a card would affect a closing of the switch instead of affecting an opening of the switch. Reichardt et al. disclose such a configurable switch in U.S. Pat. Nos. 5,334,034 and 5,370,544. The end of position switch as taught by Reichardt et al. includes two switching contact elements arranged to either close or open to detect that the card has reached the read position. While this card reader eliminates the need to redesign the reader in order to achieve different switch configurations, the same problem exists in that debris caused by the sliding actions may be deposited on the reader contacts or the switch contacts to adversely affect the electrical performance of the connector.

SUMMARY OF THE INVENTION

It is therefore an object of this invention to provide a card reader which reduces the amount of dust/debris created during the mating cycle and which has an end of position switch being configurable as normally open or normally closed. The configurability of the card reader must be achieved without any changes to the cover or base of the reader.

This object is achieved by providing a card reader having a base and a cover being hingeably mounted to the base at a first end. The cover is biased to be spaced apart from the base at a second end and has a card support disposed on an inner surface thereof proximate the second end. A first switch actuating projection is disposed along an inner surface of the cover proximate the first end and a second switch actuating projection is disposed adjacent the first switch actuating projection along the inner surface of the cover. A permanent switch contact is mounted to the base along with an interchangeable switch contact having a free end being positioned for electrical connection with the permanent switch contact. As a card is inserted, it will first engage a card support of the cover and then a cover actuating surface of the base to draw the card and the second end of the cover towards the base while simultaneously causing one of the switch actuating projections to engage and actuate one of the switch contacts.

BRIEF DESCRIPTION OF THE DRAWINGS

The invention will now be described by way of example with reference to the accompanying figures of which.

DETAILED DESCRIPTION OF THE INVENTION

Figure 4:
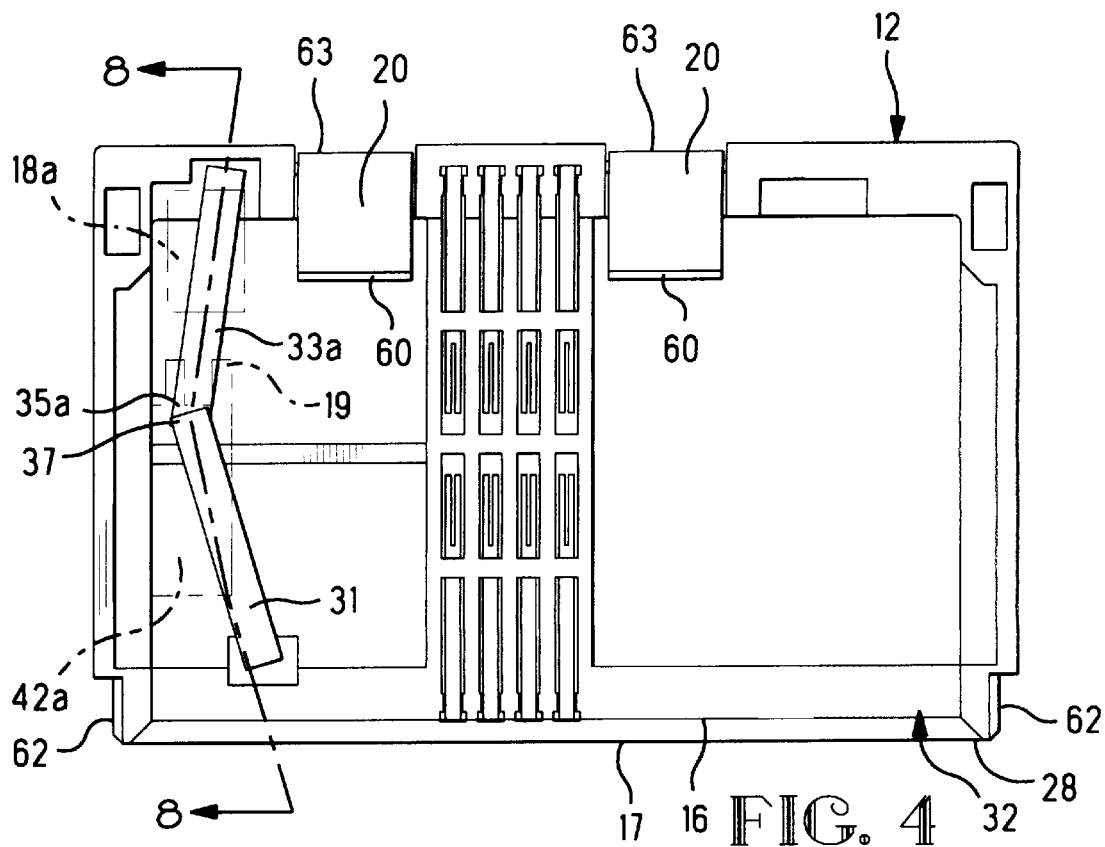
FIG. 4 shows a top view of the base having a normally closed switch configuration. Switch actuating projections of the cover are shown here in phantom.
Figure 5:
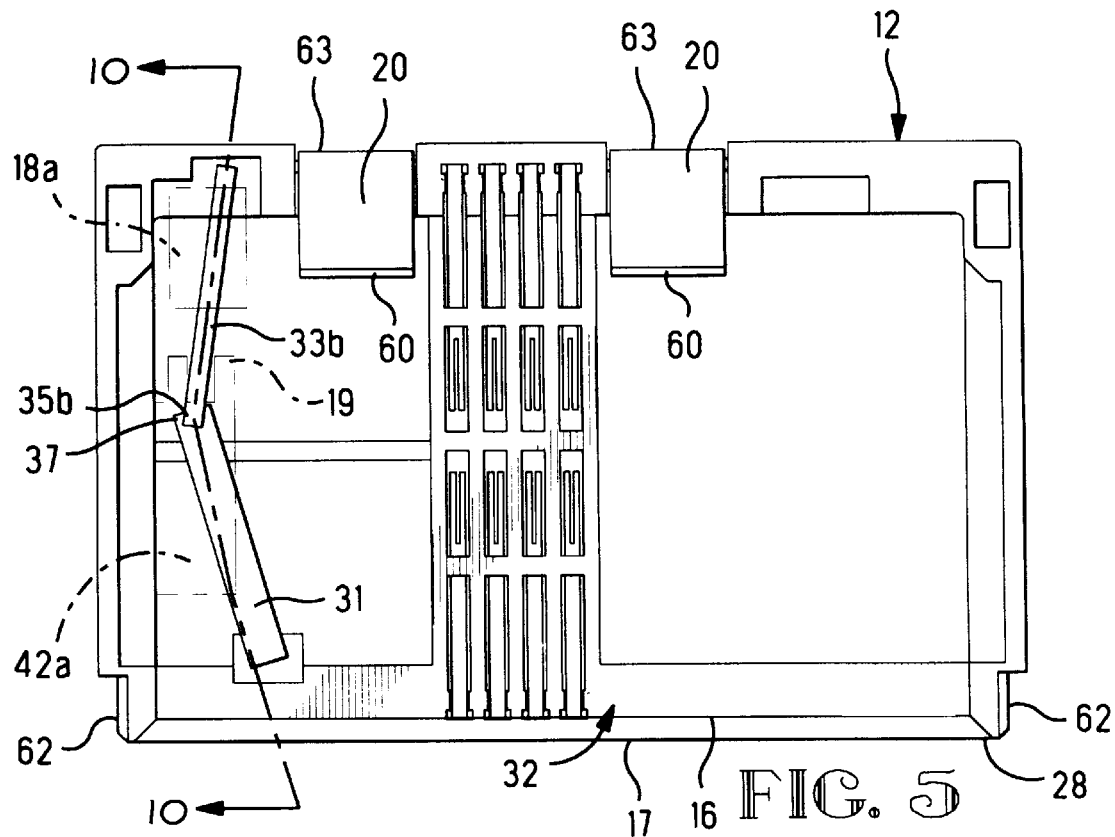
FIG. 5 shows a top view of the base similar to that of FIG. 4. This figure, however shows a normally open switch configuration.
Figure 6:
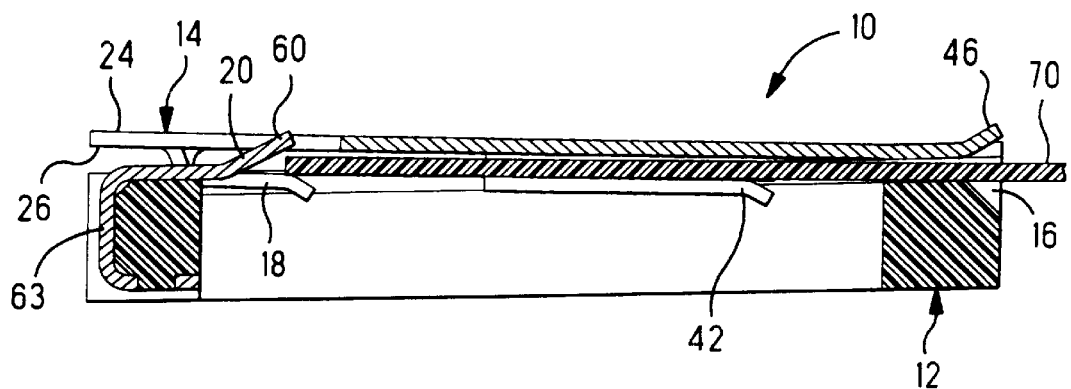
FIG. 6 shows a cross-sectional view taken along the line 6—6 FIG. 1. This figure shows the cover in the up position prior to the card reaching the read position.
Figure 7:
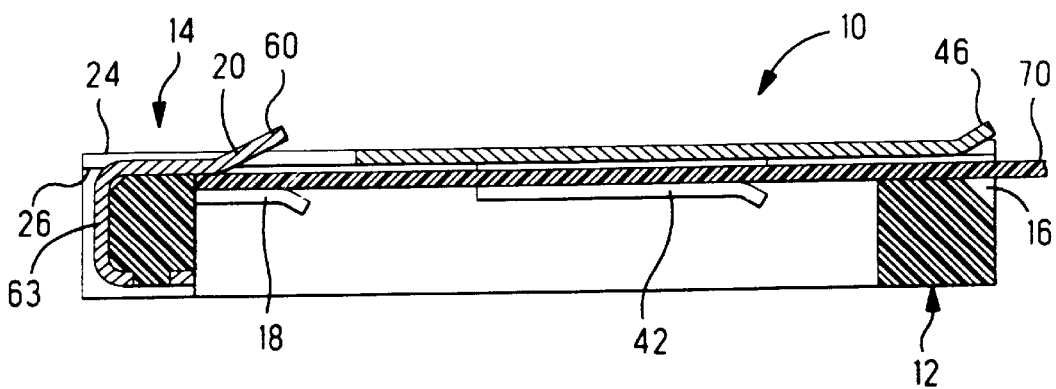
FIG. 7 is a cross-sectional view similar to that of FIG. 6 showing the card cover in the read position.
Figure 9:
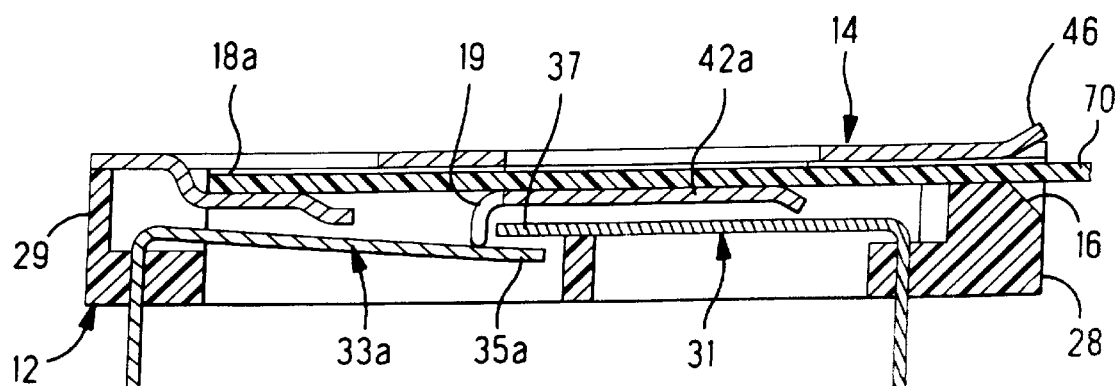
FIG. 9 is a cross-sectional view similar to that of FIG. 8 showing the card cover in the read position.
Figure 11:
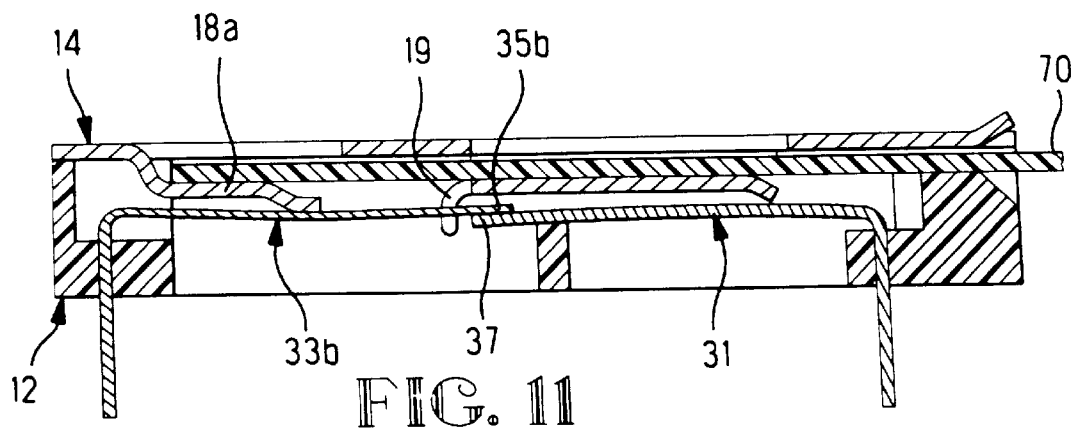
FIG. 11 is a cross-sectional view similar to that of FIG. 10 showing the card and cover in the read position.

The invention will first be described generally with reference to FIG. 1. The card reader 10 consists of five major components, an insulative base 12, a cover 14 contacts 30 which are mounted in the base 12 and are best seen in FIGS. 4 and 5, a permanent switch contact 31, and an interchangeable switch contact 33. The base 12 is provided with a card-receiving opening 16 along a first end 28 to form a card-receiving area 32 therein (FIGS. 4 & 5). Cover actuators 20 (FIGS. 6 and 7) extend from the base 12 at a second end 29 opposite the first end 28. These actuators 20 serve to draw the cover 14 and a card 70 such as a smart card into mating engagement with contacts 30 as the card 70 is inserted into the read position (FIGS. 7,9, and 11). This cover action is more fully described in copending U.S. application Ser. No. 60/031,442.

Figure 1:
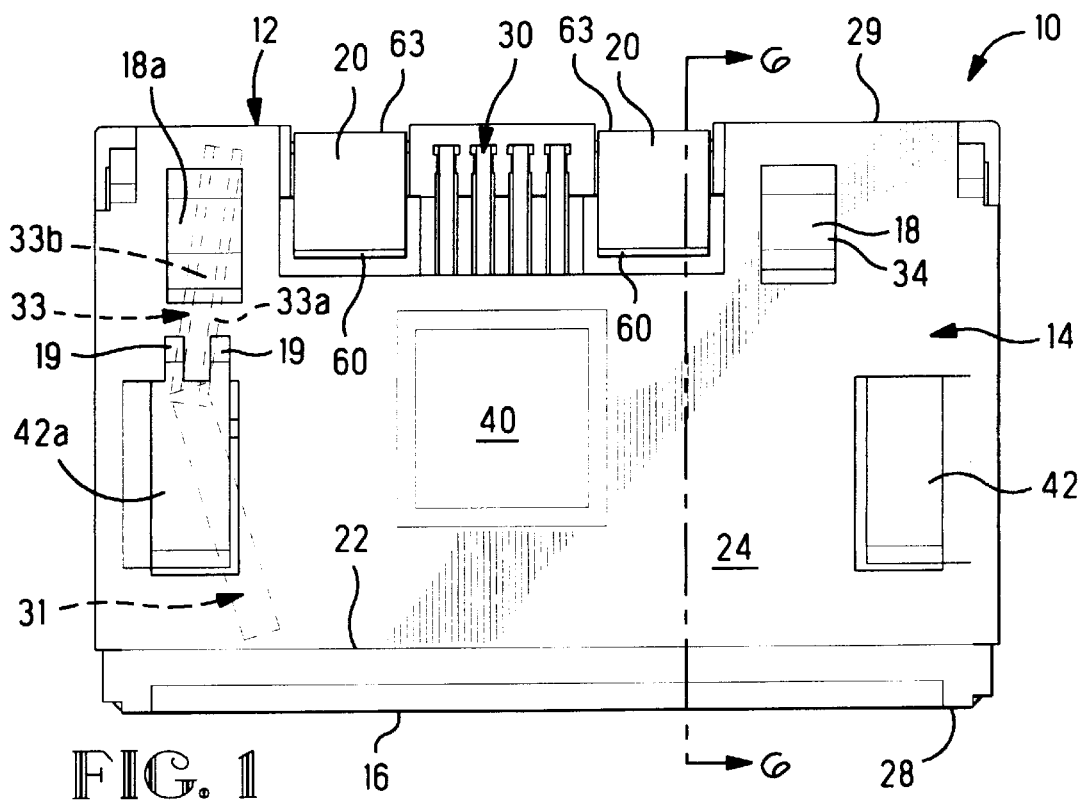
FIG. 1 shows a top view of the card reader according to the present invention.
Figure 2:
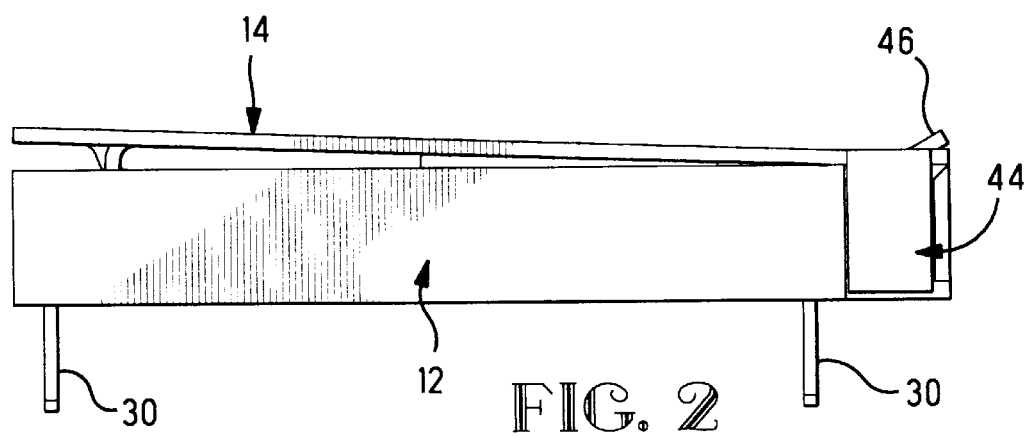
FIG. 2 shows a side view of the card reader of FIG. 1.
Figure 8:
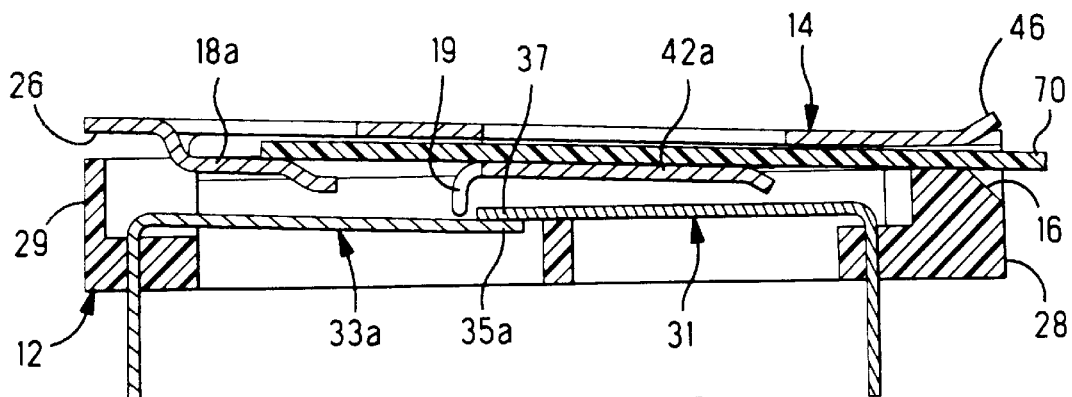
FIG. 8 shows a cross-sectional view taken along the line 8—8 FIG. 4. This figure shows the cover in the up position prior to the card reaching the read position.
Figure 10:
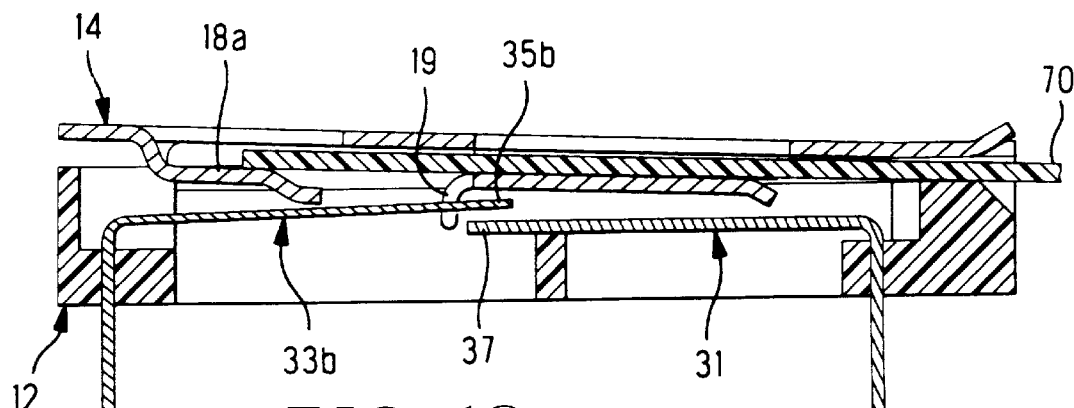
FIG. 10 is a cross-sectional view taken along the line 10—10 of FIG. 5 showing the cover in the up position and the card inserted prior to reaching the read position.

Referring to FIGS. 1 & 2, the cover will first be described in greater detail. The cover 14 is stamped and formed from a metallic material and is then mounted to the base 12 over the card-receiving opening 16 proximate the first end 28. A hinge 22 is formed in the cover 14 by bending. The cover 14 is biased so that its lower surface 26 is spaced apart from the base 12 at a location proximate the second end 29 (FIGS. 8 and 10). An opening 34 is provided in the top surface 24 and a pair of card supports 18,18a extend from the lower surface 26 toward the base 12. A smart card 70 is captured between the card supports 18 and the actuator 20 upon full insertion so as to draw the cover 14 down towards the base 12 (FIGS. 8–11).

Figure 3:
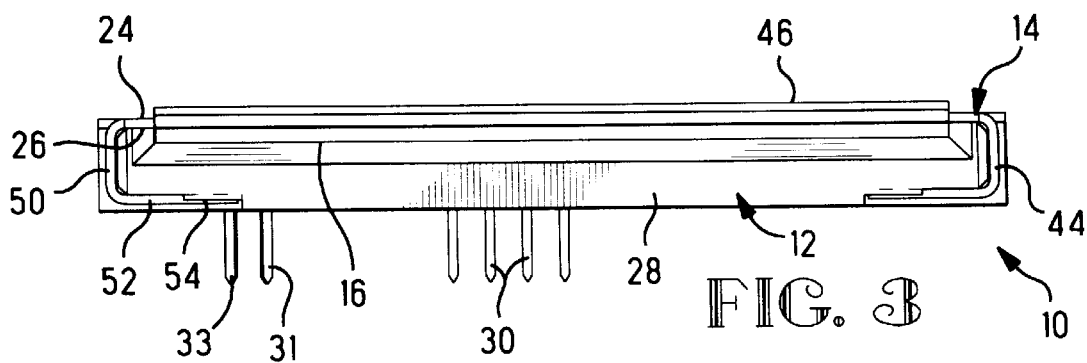
FIG. 3 shows a front view of the card reader of FIG. 1.

Referring to FIGS. 2 and 3, the cover 14 is mounted to the base 12 through a pair of mounting arms 44 which wrap around the top, side, and bottom edges of the base 12 proximate the first end 28. Each mounting arm 44 consists of a side leg 50 which is bent perpendicular to the top and bottom surfaces 24,26 and a bottom leg 52 which is bent at an acute angle to the side leg 50 such that it contacts the base 12 only at an extreme edge 54 (FIG. 3). A lead in surface 46 is provided proximate the mating end 28. The cover 14 is also profiled to have guide members 42,42a which are stamped and formed from the cover 14 such that they are disposed below the bottom surface 26 as best seen in FIGS. 7–8. A depression 40 is similarly formed in the center of the cover 14 such that it projects below the bottom surface 26. The card supports 18, 18a are similarly stamped and formed from the cover 14 such that they project below the bottom surface 26. It should be noted here that one of the card supports 18a will also serve as a first switch actuating projection 18a. A set of second switch actuating projections 19 are located adjacent the first switch actuating projection 18a extend from the guide member 42a such that they project below the bottom surface 26.

The base 12 will now be described in greater detail with reference to FIGS. 4 and 5. A top view of the base 12 is shown here indicating how the contacts 30 are mounted therein such that four exit the bottom of the base 12 proximate the first end 28 and four exit the base at the second end 29. A pair of actuators 20 are provided at the second end 29. The actuators 20 are simply stamped and formed having a lead in edge 60 and a securing section 63 which is wrapped around the top, rear, and bottom surfaces of the base 12. The card-receiving opening 16 is provided at the first end 28 with a lead in surface 17 which extends from the first end 28 to the card-receiving area 32. Arm-receiving areas 62 disposed along side walls of the base 12 are provided for receiving the mounting arms 44 of the cover 14.

The switching mechanism will now be described in greater detail with reference to FIGS. 4 through 11. The switching mechanism consists of two switch contacts 31,33. The permanent switch contact 31 is mounted to the base similar to the contacts 30 such that a tail extends through the base 12 for mounting to a printed circuit board (not shown). A free end 37 extends from the tail section similar to the contacts 30. An interchangeable switch contact 33a,33b is similarly mounted to the base and has a contact tail extending therethrough for mounting to a printed circuit board. A free end 35a,35b extends toward the free end 37 of the permanent switch contact 31. As can be see in FIGS. 4 and 5, the interchangeable switch contact may be chosen from either a wide contact 33a to form a normally closed switch where the permanent switch contact 31 is disposed over the top of the free end 35a of the interchangeable switch contact 33a, or a narrow interchangeable switch contact 33b having its free end 35b disposed over top of the permanent switch contact free end 37.

Insertion of the card 70 and operation of the switches will now be described in greater detail with reference to FIGS. 8 to 11. First, the normally closed switch configuration as shown in FIGS. 4,8, and 9 will be described. It should be noted that in this configuration the interchangeable switch contact 35a is structurally the same as the permanent switch contact 31. The mating cycle begins with the reader 10 having the cover 14 in the open position as shown in FIG. 8. A card 70 is then introduced into the card-receiving opening 16 and further insertion of the card 70 will result in engagement with guide projections 42,42a. The card 70 will then engage the card suppports 18,18a and finally upon further insertion will engage the actuators 20 (FIG. 4) to draw the card 10 and the cover 14 into the read position shown in FIG. 9. As the cover 14 is being drawn towards the base 12, it can be seen from FIGS. 8 and 9 that the first switch actuating projection 18a does not engage the interchangeable switch contact 33a. Instead, the second switch actuating projections 19 engage the interchangeable switch contact 33a near the free end 35a to cause it to disengage the free end 37 of the permanent switch contact 31 causing an opening of the switch. It should also be noted that upon withdrawal of the card 70, these steps will occur in reverse order thus causing the switch to close once again.

Referring to FIGS. 5, 10 and 11, a mating cycle for the normally open switch configuration will now be described in greater detail. It should first be noted that the interchangeable switch contact 33b in this configuration is narrower than the interchangeable switch contact 33a and passes between the second switch actuating projections 19. Also, in this configuration the interchangeable switch contact 33b is disposed above the permanent switch contact 31 as opposed to being below the permanent switch contact 31 as in the normally closed configuration. The interchangeable switch contact 33b is also biased upward and away from the free end 37 of the permanent switch contact 31 (FIG. 10). Since the cover 14 is similarly drawn towards the base 12 upon card insertion, that motion will not be described here again. As the cover 14 is drawn towards the base 12, the second actuating projections 19 will pass the interchangeable switch contact 33b. The first switch actuating projection 18a instead will engage the interchangeable switch contact 33b causing the free end 35b thereof to contact the free end 37 of the permanent switch contact 31, thus causing the switch to close. Removal of the card 70 will effectuate an opening this switch by reversing the steps described above.

An advantage of this invention is that it provides a configurable end of position switch arrangement which will indicate full insertion of a card 70 into the card reader 10. The switch is configurable to be either normally open or normally closed and may be simply changed by replacement of the interchangeable switch contact 33. No changes to the cover 14 or base 12 are required in order to achieve either switch configuration.

An advantage of this invention is that it provides a simple card reader arrangement which offers sufficient wiping action to achieve good electrical connection without excessively wiping on the plastic areas of the card 70 to create unwanted dust or debris.

Another advantage of this invention is that the cover 14 and actuators 20 are formed from metal so that the surfaces thereof which contact and wipe along the card 70 during the mating cycle will not create excess dust.

I claim:

1. A card reader having a base which supports electrical contacts and a card receiving area comprising:

a cover being hingeably mounted to the base at a first end and biased to be spaced apart from the base at a second end, the cover having an inner surface proximate the card receiving area, an outer surface opposite the inner surface, a card support disposed on the inner surface proximate the second end, a first switch actuating projection disposed proximate the second end, and at least one second switch actuating projection disposed adjacent the first switch actuating projection, a permanent switch contact being mounted to the base, an interchangeable switch contact being mounted to the base and having a free end positioned for electrical connection with the permanent switch contact whereby a card is insertable into the card receiving area from the first end until it first engages the card support and then engages a cover actuating surface of the base to draw the card and the second end of the cover toward the base while simultaneously causing one of the actuating projections to engage and actuate one of the switch contacts.

2. The card reader as recited in claim 1 wherein the first switch actuating projection extends from the card support toward the base.

3. The card reader as recited in claim 1 further comprising at least one card guide member extending from the outer surface of the cover toward the base into the card receiving area whereby the guide member is profiled to receive a side edge of the card for guiding it toward a read position.

4. The card reader as recited in claim 3 wherein the second switch actuating projection extends from the guide member.

5. The card reader as recited in claim 1 wherein the interchangeable switch contact is structurally the same as the permanent switch contact.

6. The card reader as recited in claim 1 wherein the interchangeable switch contact is profiled to engage a pair of second switch actuating projections of the cover as the second end of the cover is drawn toward the base.

7. The card reader as recited in claim 5 or 6 wherein the interchangeable switch contact is biased to be in contact with the permanent switch contact before insertion of the card into the reader and the second actuating projection engages the interchangeable switch contact causing disengagement thereof from the permanent switch contact as the card is fully inserted into the read position and the cover is drawn toward the base.

8. The card reader as recited in claim 1 wherein the interchangeable switch contact is narrower than the permanent switch contact.

9. The card reader as recited in claim 1 wherein the interchangeable switch contact is profiled to pass between a pair of second switch actuating projections of the cover as the second end of the cover is drawn toward the base.

10. The card reader as recited in claims 8 or 9 wherein the interchangeable switch contact is biased to be spaced apart from the permanent switch contact before insertion of the card into the reader and the first actuating projection engages the interchangeable switch contact causing engagement thereof with the permanent switch contact as the card is fully inserted into the read position and the cover is drawn toward the base.

11. The card reader as recited in claim 1 wherein the cover further comprises a pair of mounting arms extending along opposite sides thereof for engaging respective side surfaces of the base.

\* \* \* \* \*